United States Patent
Inoue et al.

(10) Patent No.: US 9,749,222 B2
(45) Date of Patent: Aug. 29, 2017

(54) PARALLEL COMPUTER, NODE APPARATUS, AND CONTROL METHOD FOR THE PARALLEL COMPUTER

(71) Applicant: FUJITSU LIMITED, Kawasaki-shi, Kanagawa (JP)

(72) Inventors: Tomohiro Inoue, Kawasaki (JP); Yuichiro Ajima, Kawasaki (JP); Shinya Hiramoto, Yokohama (JP); Masahiro Maeda, Zama (JP); Shun Ando, Yokohama (JP); Yuta Toyoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 258 days.

(21) Appl. No.: 14/664,071

(22) Filed: Mar. 20, 2015

(65) Prior Publication Data

US 2015/0195191 A1    Jul. 9, 2015

Related U.S. Application Data

(63) Continuation of application No. PCT/JP2012/074414, filed on Sep. 24, 2012.

(51) Int. Cl.
| | |
|---|---|
| *H04L 12/707* | (2013.01) |
| *H04L 12/24* | (2006.01) |
| *G06F 15/173* | (2006.01) |
| *H04L 12/721* | (2013.01) |

(52) U.S. Cl.
CPC ........ *H04L 45/22* (2013.01); *G06F 15/17362* (2013.01); *H04L 41/0663* (2013.01); *H04L 41/0677* (2013.01); *H04L 45/14* (2013.01)

(58) Field of Classification Search
CPC ......... H04L 47/12; H04L 47/70; H04L 45/22; H04L 41/0663; H04L 41/0677; H04Q 11/0005; Y04S 40/166
See application file for complete search history.

(56) References Cited

U.S. PATENT DOCUMENTS

| 5,737,628 A | 4/1998 | Birrittella et al. |
| 2004/0120266 A1* | 6/2004 | Ko ........................ H04L 45/742 370/252 |

(Continued)

FOREIGN PATENT DOCUMENTS

| JP | H10-69471 A | 3/1998 |
| JP | 2007-074074 A | 3/2007 |

(Continued)

OTHER PUBLICATIONS

Chinese Office Action issued Jul. 8, 2016 for corresponding Chinese Patent Application No. 201280075962.2, with English Translation, 19 pages.

(Continued)

*Primary Examiner* — Chirag R Patel
(74) *Attorney, Agent, or Firm* — Fujitsu Patent Center

(57) ABSTRACT

A parallel computer includes a plurality of nodes. Each of the nodes includes a router directly or indirectly connected to each of the other nodes and a network interface connected to an external network of the parallel computer. The network interface includes a storage unit that holds detour route information indicating a detour route corresponding to a communication route from a node in which the network interface is included to another node. The network interface further includes a reception processing unit that, when the network interface receives data destined to one node of the parallel computer from the external network, sets detour route information corresponding to a communication route from the node in which the network interface is included to the destination node of the data for the data and transmits the data for which the detour route information is set to the destination node.

7 Claims, 13 Drawing Sheets

(56) References Cited

U.S. PATENT DOCUMENTS

| | | | |
|---|---|---|---|
| 2007/0083672 A1 | 4/2007 | Shima et al. | |
| 2007/0242684 A1 | 10/2007 | Hayakawa et al. | |
| 2010/0238944 A1 | 9/2010 | Ajima et al. | |
| 2010/0267390 A1* | 10/2010 | Lin | H04L 12/5895 455/445 |
| 2011/0055428 A1* | 3/2011 | Ajima | G06F 15/16 709/250 |

FOREIGN PATENT DOCUMENTS

| | | |
|---|---|---|
| JP | 2007-110240 A | 4/2007 |
| JP | 2010-218364 A | 9/2010 |
| WO | 2006/046576 A1 | 5/2006 |
| WO | 2009/139024 A1 | 11/2009 |

OTHER PUBLICATIONS

Yuichiro Ajima et al., "Tofu: Interconnect for the K Computer" Fujitsu Sci. Tech. J., vol. 48, No. 3, pp. 280-285 (Jul. 2012) cited in the ISR for PCT/JP2012/074414 as referred to as "Super Computer 'K'" (6 pages).

Yuichiro Ajima et al., "Tofu: Interconnect for the K Computer" Fujitsu 63, 3, p. 260-264 (May 2012) and Japanese Abstract cited in the ISR for PCT/JP2012/074414 as referred to as "Super Computer 'K'" (7 pages).

International Search Report and Written Opinion of the International Searching Authority (Form PCT/ISA/237), mailed in connection with PCT/JP2012/074414 and mailed Dec. 18, 2012 (13 pages).

Japanese Office Action mailed Jun. 7, 2016 for corresponding Japanese Patent Application No. 2014-536537, with Partial English Translation, 6 pages.

Puente, V. et al., "Immunet: A Cheap and Robust Fault-Tolerant Packet Routing Mechanism," ACM SIGARCH Computer Architecture News, ACM Special Interest Group on Computer Architecture, vol. 32, No. 2, Mar. 2, 2004, pp. 1-12, XP058266837.

Extended European Search report dated May 12, 2017 for corresponding European Patent Application No. 12885000.5, 9 pages.

* cited by examiner

| MAC ADDRESS | NODE ADDRESS | DETOUR ROUTE |
|---|---|---|
| MAC ADDRESS 0 | NODE ADDRESS 0 | DETOUR ROUTE 0 |
| MAC ADDRESS 1 | NODE ADDRESS 1 | DETOUR ROUTE 1 |
| ⋮ | ⋮ | ⋮ |
| MAC ADDRESS n−1 | NODE ADDRESS n−1 | DETOUR ROUTE n−1 |

US 9,749,222 B2

PARALLEL COMPUTER, NODE APPARATUS, AND CONTROL METHOD FOR THE PARALLEL COMPUTER

CROSS-REFERENCE TO RELATED APPLICATION

This application is a continuation application of International Application PCT/JP2012/074414 filed on Sep. 24, 2012 and designated the U.S., the entire contents of which are incorporated herein by reference.

FIELD

The disclosures made herein relate to a parallel computer, a node apparatus, and a control method for the parallel computer.

BACKGROUND

There is a parallel computer capable of communicating with an external network. FIG. 1 illustrates an example of a parallel computer that transmits and receives data to and from an external network. A parallel computer 1A in FIG. 1 includes a plurality of calculation nodes 11a, 11b, . . . that perform calculation processing and one I/O (Input/Output) node 12 connected to an NIC (Network Interface Card) 13 for communication with an external apparatus. Each of the calculation nodes and the I/O node includes a CPU (Central Processing Unit) and a router. Each calculation node 11 and the I/O node 12 are connected via the routers. The CPU of the I/O node 12 is connected to the NIC 13 and is capable of communicating with an external network 2A via the NIC 13.

As topologies for connecting a plurality of calculation nodes and an I/O node included in a parallel computer, a mesh, a torus, and the like are known. If a plurality of routes that can be selected are present between a transmission source calculation node and a destination I/O node, it is possible for each calculation node of the parallel computer to, even in a case where a failure occurs in a calculation node on a communication route, transmit data, making a detour to avoid the calculation node where the failure has occurred.

The following are related arts to the invention.
[Patent document 1] Japanese Patent Laid-Open Publication No. JP H10-69471
[Patent document 2] Japanese Patent Laid-Open Publication No. JP 2007-110240

SUMMARY

However, a detour route is to be specified, for example, by a management node that allocates processes to the calculation nodes of the parallel computer, and the NIC of the I/O node does not hold a detour route to be set for data received from an external network. Therefore, when receiving data destined to a calculation node inside the parallel computer from the external network, the NIC of the I/O node is unable to set a detour route in a network inside the parallel computer for the received data.

An aspect of the disclosed technique is a parallel computer including a plurality of nodes. Each of the nodes includes a router directly or indirectly connected to each of the other nodes and a network interface connected to an external network of the parallel computer. The network interface includes a storage unit that holds detour route information indicating a detour route corresponding to a communication route from a node in which the network interface is included to another node. The network interface further includes a reception processing unit that, when the network interface receives data destined to one node of the parallel computer from the external network, sets detour route information corresponding to a communication route from the node in which the network interface is included to the destination node of the data for the data and transmits the data for which the detour route information is set to the destination node.

Objects and advantages of the disclosures will be realized and attained by means of the elements and combinations particularly pointed out in the claims.

DESCRIPTION OF EMBODIMENTS

A parallel computer according to an embodiment will be described below with reference to drawings. The configuration of the embodiment below is an example, and the present parallel computer is not limited to the configuration of the embodiment.

[Topology of Interconnect]

First, a topology of an interconnect of the parallel computer (that is, a connection form of an internal network of the parallel computer) will be described. The parallel computer has a plurality of calculation nodes, and each calculation node has a CPU, a router and the like. Each calculation node is connected to other some calculation nodes via the router. An internal network connecting the calculation nodes is called an interconnect. The plurality of CPUs perform calculation in parallel, mutually transmit and receive calculation results via the interconnect, and transmit and receive data between the calculation nodes in the parallel computer and an external network.

Interconnect topologies can be classified on the basis of a degree indicating the number of connections (that is, links) with adjoining calculation nodes, a diameter indicating the largest distance among calculation nodes, symmetry and the like. In the case of complete connection in which each calculation node is connected to all the other calculation nodes, any two calculation nodes can directly communicate with each other without passing through another calculation node and the like. However, implementation of complete connection becomes difficult with increase in the number of calculation nodes. Therefore, realistically, a mesh that is a topology in which adjoining calculation nodes are connected in a mesh structure, a torus that is a topology in which calculation nodes at ends in a mesh are mutually connected to equalize the number of links among all calculation nodes, or the like is adopted.

Figure 1:
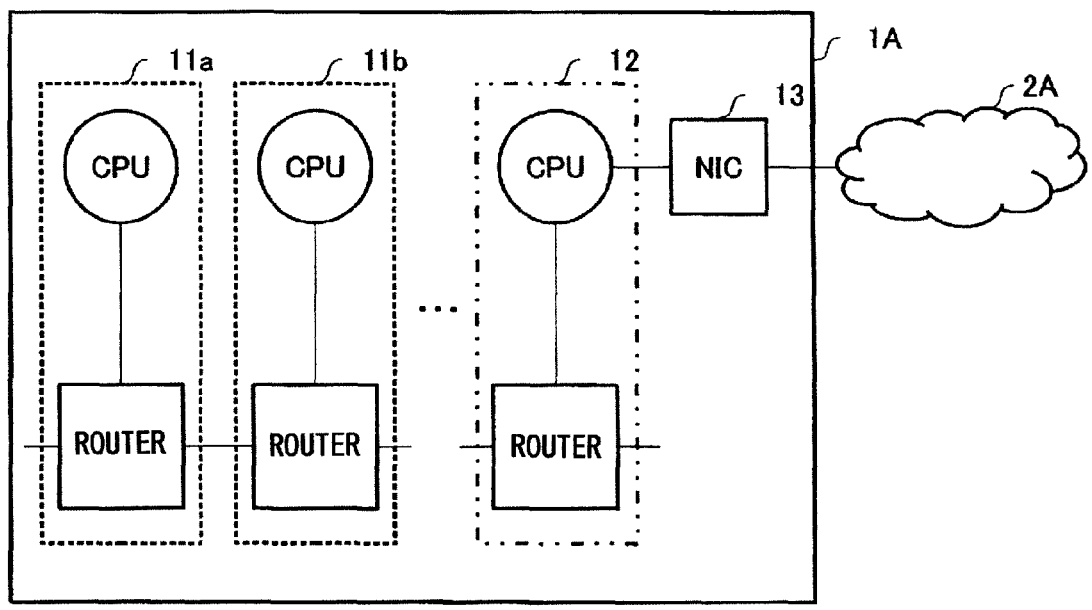
FIG. 1 is a diagram illustrating an example of a parallel computer.
Figure 2:
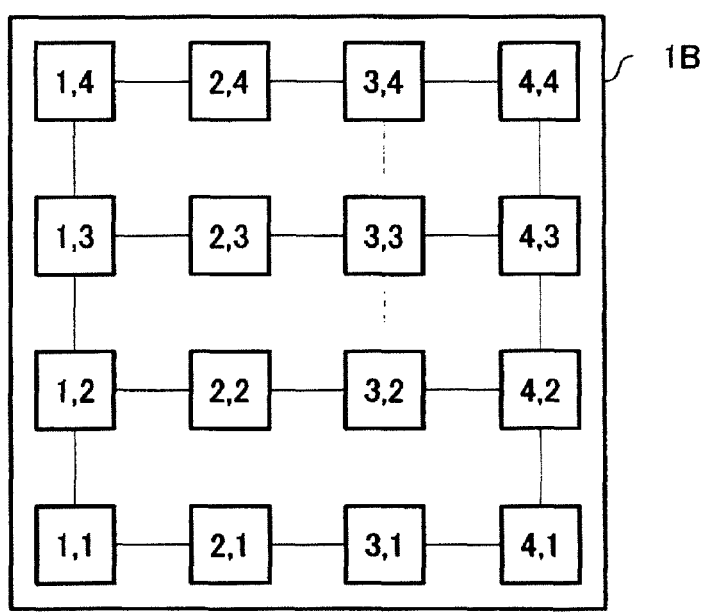
FIG. 2 is a diagram for illustrating a two-dimensional mesh.

FIG. 2 illustrates an example of a two-dimensional mesh. A parallel computer 1B illustrated in FIG. 2 includes four calculation nodes in a mesh structure in each of an X direction indicating a horizontal direction and a Y direction indicating a vertical direction in FIG. 2, that is, sixteen calculation nodes in total in a mesh structure. Each calculation node is connected to calculation nodes adjoining in the X and Y directions . The number of nodes connected to a calculation node present on an outer circumferential part is smaller than the number of nodes connected to a calculation node present on an inner side of the outer circumferential part. In the example of FIG. 2, two kinds of sequential numbers indicating places in connection order in the X and Y directions are given as an identification mark of a calculation node for convenience.

Figure 3:
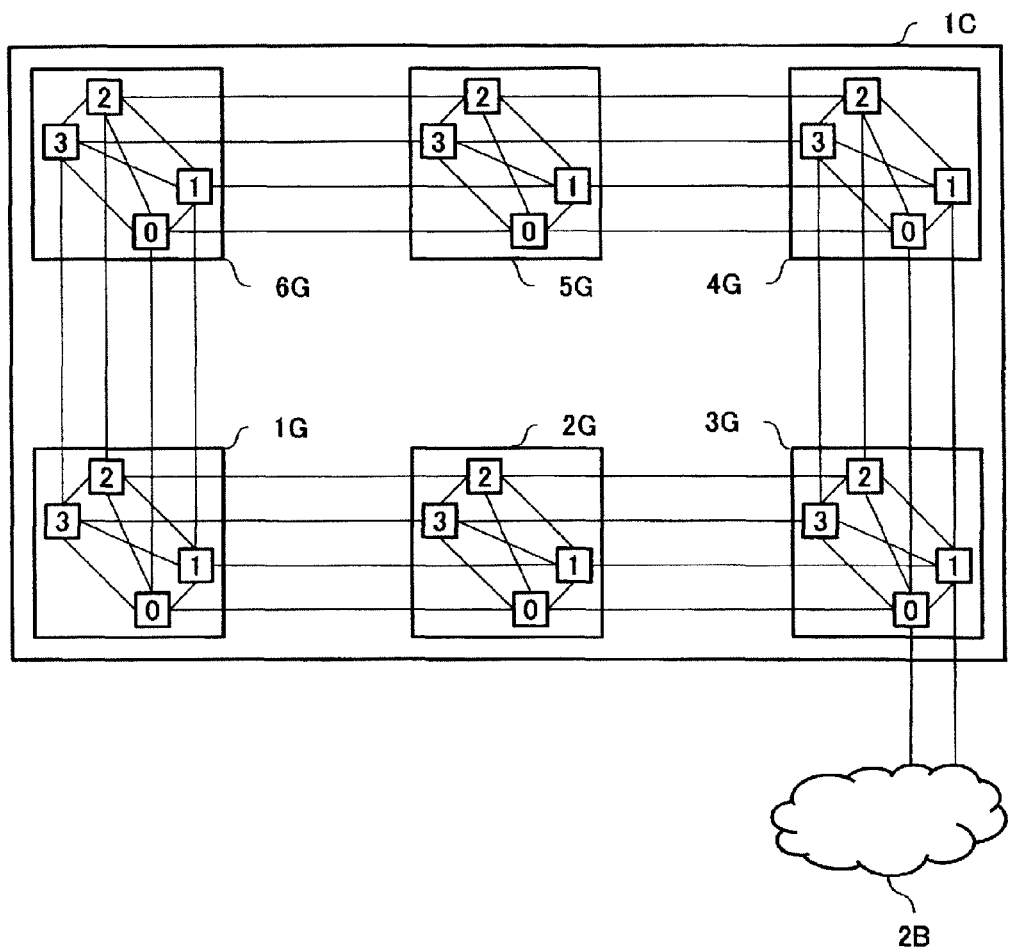
FIG. 3 is a diagram illustrating an example of an interconnect.

FIG. 3 illustrates an example of a topology according to the present embodiment. Twenty-four calculation nodes (also referred to as node apparatuses) included in a parallel computer 1C in FIG. 3 are divided in six groups 1G to 6G. Each group includes four calculation nodes 0 to 3, and the four calculation nodes 0 to 3 in the group are mutually connected in complete connection. Calculation nodes on corresponding posit ions among groups (in the example of FIG. 3, calculation nodes having the same number in the groups) are connected in series and form a one-dimensional torus. In the example of FIG. 3, for convenience, the calculation nodes are called calculation node 1G0 to calculation node 6G3 by combining a group number and a node number in order to identify each of the calculation nodes. Further, in the example of FIG. 3, calculation nodes 3G0 and 3G1 are connected to an external network 2B for which the Ethernet (R) standards are adopted (hereinafter also referred to as an Ethernet 2B). In the present embodiment, a calculation node communicably connected to an external network is also referred to as an I/O node for convenience.

In the present embodiment, a router of at least one calculation node has an Ethernet NIC. Routers of all the calculation nodes may have an Ethernet NIC (that is, a network interface connected to an external network) . If configurations of the plurality of calculation nodes a parallel computer has are uniformed, man-hours taken for development and verification of the calculation nodes can be suppressed.

Figure 4:
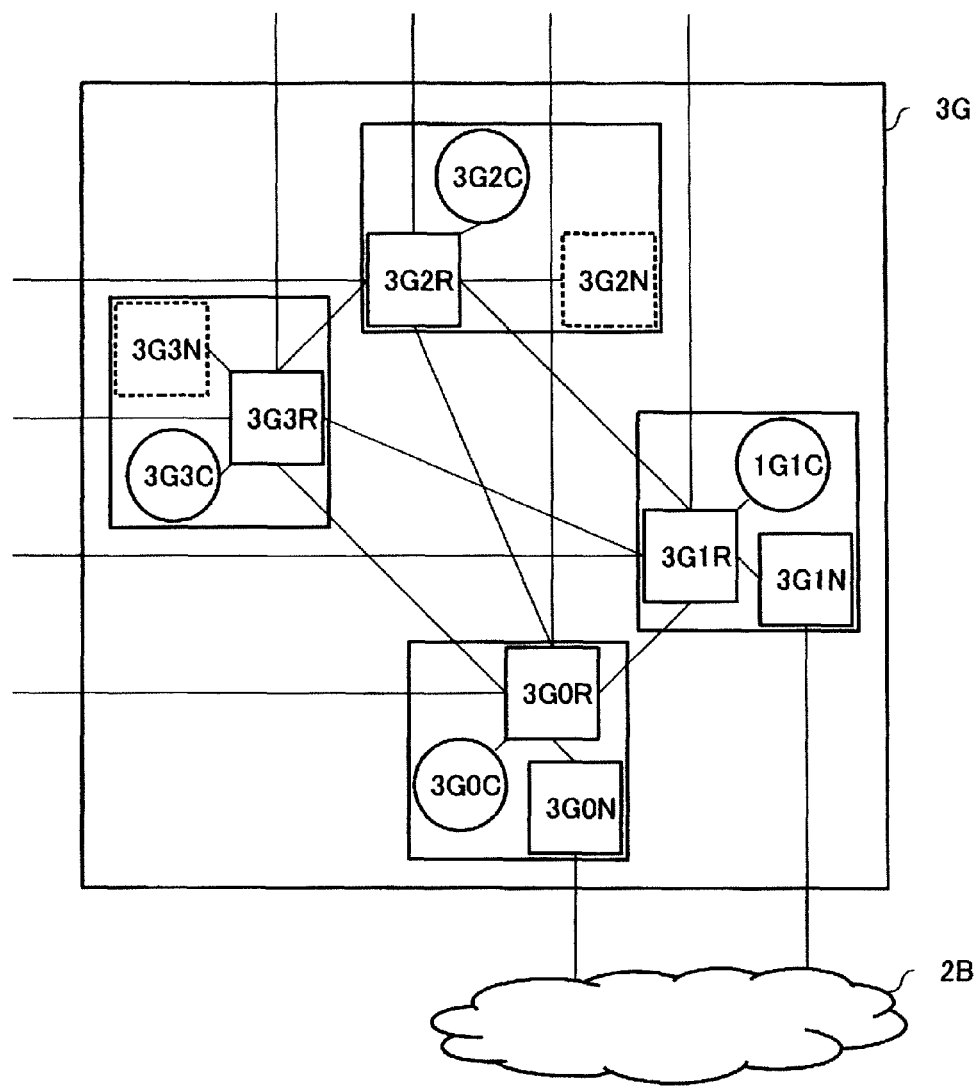
FIG. 4 is a diagram for illustrating details of the interconnect.

Next, details of connection between the group 3G and the Ethernet 2B in FIG. 3 is illustrated in FIG. 4. In the example of FIG. 4, the group 3G includes four calculation nodes 3Gi (i=0, 1, 2, 3). Each of the calculation nodes 3Gi has a CPU 3GiC, a router 3GiR and an Ethernet NIC 3GiN. Though the router and the Ethernet NIC are illustrated being connected to each other for convenience, the router may have the Ethernet NIC. The Ethernet NICs 3G0N and 3G1N are connected to the Ethernet 2B. In this manner, at least a part of the plurality of Ethernet NICs are physically connected to an external network (for example, the Ethernet) via switches or the like.

A management node connected to the internal network of the parallel computer may switch between "enabled" and "disabled" settings for the Ethernet NIC. In the example of FIG. 4, it is assumed that the Ethernet NICs 3G2N and 3G3N indicated by broken lines are set to "disabled" and in a state of not functioning as an Ethernet NIC. For the Ethernet NICs 3G0N and 3G1N indicated by solid lines, the function as an Ethernet NIC is enabled.

For example, the management node may cause the "enabled" or "disabled" setting to be stored in a predetermined registry in association with each Ethernet NIC. The management node may specify an Ethernet NIC to be used by each calculation node for communication with the external network, on the basis of the setting. That is, by the management node changing the setting, the Ethernet NIC each calculation node has can be enabled or disabled. The management node may appropriately enable or disable the Ethernet NICs at the time of starting the parallel computer or at the time of performing allocation of processes (also referred to as input of jobs) to be executed by the calculation nodes.

Figure 5:
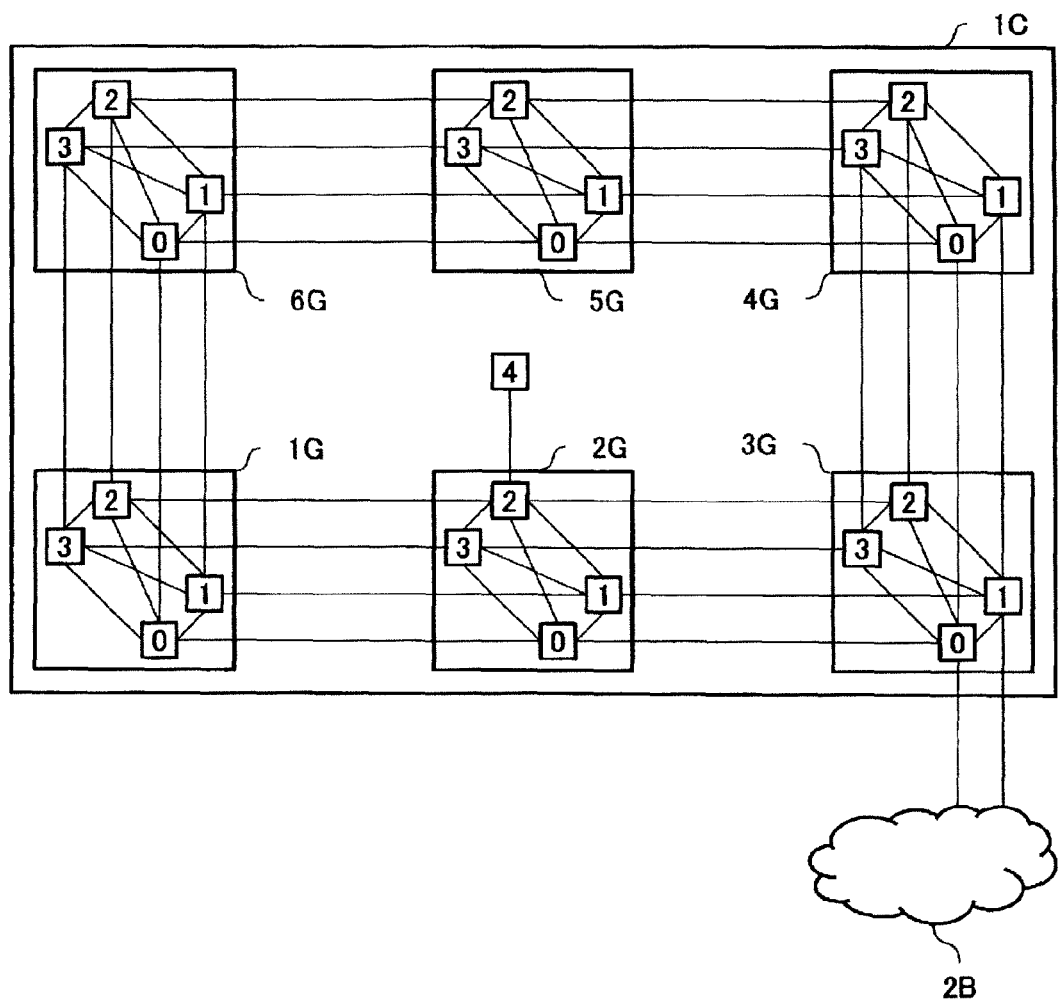
FIG. 5 is a diagram illustrating another example of the interconnect.

The management node according to the present embodiment is, for example, a node that controls operations of the plurality of calculation nodes. The management node may be any of the calculation nodes 1G0 to 6G3 illustrated in FIG. 3 or may be, for example, another node connected to at least one calculation node among the calculation nodes 1G0 to 6G3 as illustrated in FIG. 5. A management node 4 illustrated in FIG. 5 is connected to the calculation node 2G2. Further, as stated above, the management node has a register not illustrated in FIG. 5, and the register can store the "enabled" or "disabled" setting in association with the Ethernet NIC each calculation node has.

The number of groups, the number of calculation nodes included in the groups and the number of connections among the calculation nodes illustrated in FIGS. 3 to 5 are examples, and the parallel computer according to the present embodiment is not limited thereto.

[Configuration of Node]

Figure 6:
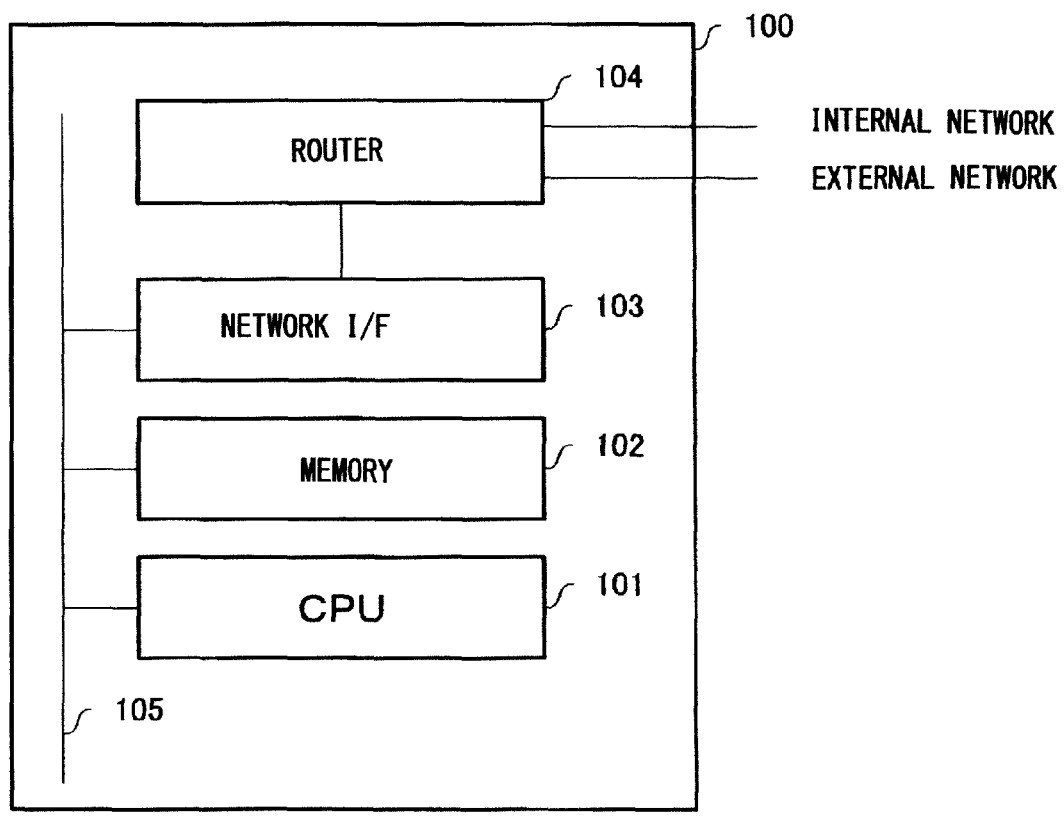
FIG. 6 is a diagram illustrating an example of the configuration of a node.

FIG. 6 illustrates an example of the configuration of a calculation node. A calculation node 100 (corresponding to the calculation nodes 1G0 to 6G3 in FIGS. 3 and 5) of a parallel computer 1 according to the present embodiment has a CPU 101, a memory 102, a network I/F (Interface) 103 and a router 104. The CPU 101, the memory 102, the network I/F 103 are connected via a bus 105. Further, the network I/F 103 and the router 104 are connected to each other, and the router 104 is connected to one or more other calculation nodes present in an internal network, which are not illustrated. Furthermore, the router 104 may be connected to an external network (for example, an Ethernet) via a network I/F (for example, an Ethernet NIC) the router 104 has, which is not illustrated. Further, the network I/F 103 each calculation node has is given a physical address (for example, a MAC address) , and it is possible to communicate with the external network using the physical address. In the present embodiment, the physical address refers to a specific address assigned to a communication apparatus in advance. For the management node stated above also, for example, a configuration similar to that of the calculation node illustrated in FIG. 6 can be adopted.

The CPU 101 of the calculation node 100 receives input of a job, for example, the management node not illustrated via the internal network and the router 104 and performs arithmetic processing. Further, the CPU 101 transmits and receives calculation results to and from other calculation nodes via the router 104 and the internal network and transmits and receives data to and from an external apparatus not illustrated via the router 104 and the external network. Further, the CPU 101 appropriately stores and reads out data used for processing, calculation results and the like into or from the memory 102.

Figure 7A:
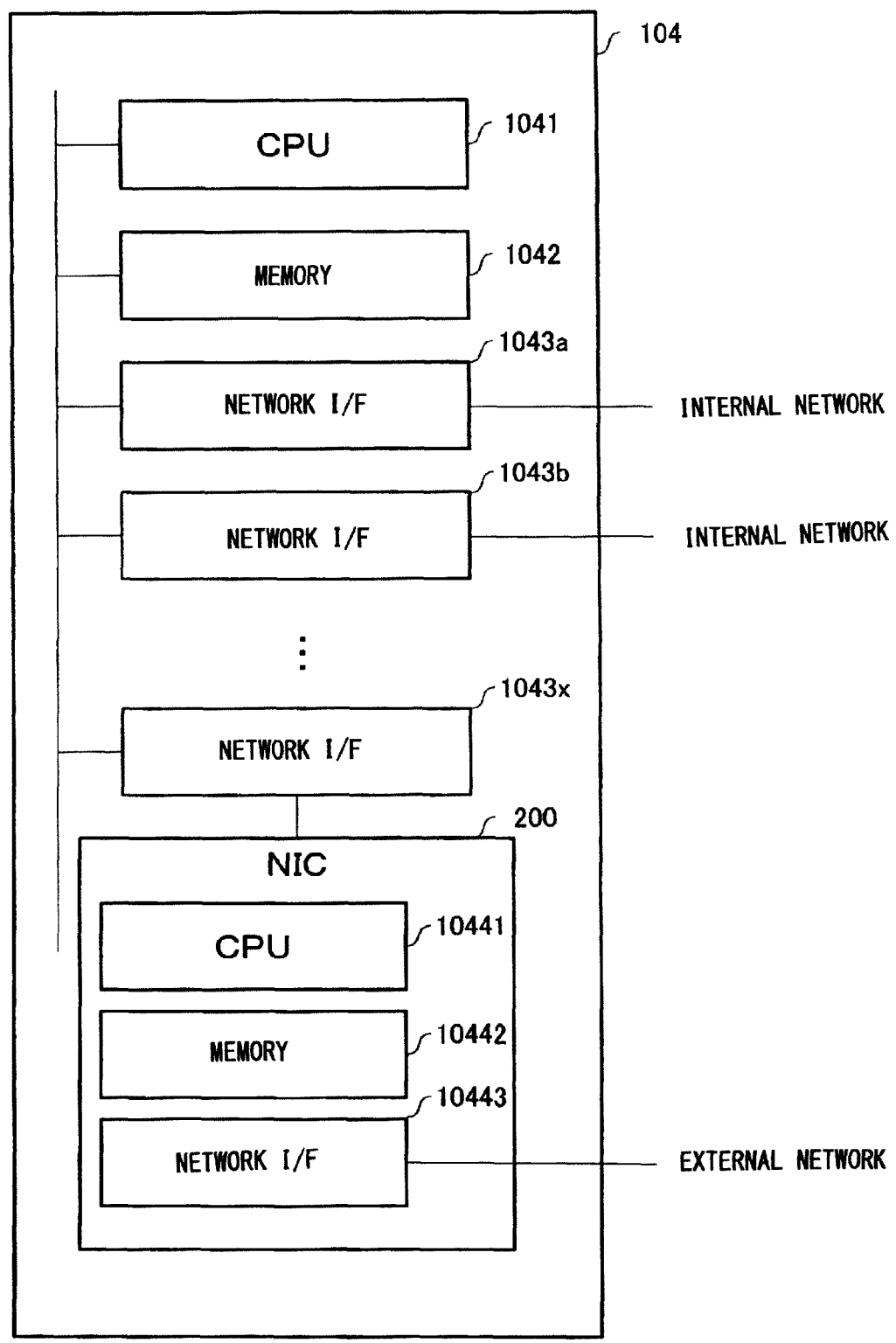
FIG. 7A is a diagram illustrating an example of the configuration of a router.

FIG. 7A illustrates an example of the configuration of the router 104. The router 104 according to the present embodiment has a CPU 1041, a memory 1042, network I/Fs 1043 (1043*a* to 1043*n*) and a NIC (Network Interface Card) 200. The CPU 1041 executes a program stored in the memory 1042 to perform a routing process.

Specifically, the CPU 1041 performs reception via the network I/F 1043, judges a destination of data on the basis of the content of the data held in the memory 1042, and outputs the data to the network I/F 1043 connected to the internal network or the external network. The CPU may be a processing device such as a microcontroller. Routing can be performed not by the processing device such as a CPU executing the program but by hardware. For example, routing may be performed by a dedicated LSI (Large Scale Integration) manufactured by a design/development method like that for a gate array.

The memory 1042 is a volatile or nonvolatile storage device, and it stores a program to be executed by the CPU or holds data to be transferred. The network I/F 1043 is a port for connecting the router to a router of another calculation node or the like. The router each calculation node in the parallel computer has is connected to the routers of adjoining calculation nodes via the network I/F 1043. Further, the NIC 200 is connected to the network I/F 1043 and the external network, and performs conversion between transfer data of the internal network and transfer data of the external network.

Further, the NIC (for example, an Ethernet NIC) 200 has a CPU 10441, a memory 10442 and a network I/F 10443, for example . The CPU 10441 executes a program stored in the memory 1042 to perform a process for mutually converting a packet of the internal network and an Ethernet frame of the external network. The CPU 10441 may be a processing device like a microcontroller or may be implemented by hardware, similarly to the CPU 1041 of the router 104 . The memory 10442 is a volatile or nonvolatile storage device, and it stores programs to be executed by the CPU 10441, a table holding addresses of the calculation nodes in the internal network and physical addresses of the calculation nodes being mutually associated, data to be transferred, and the like . The NIC 200 is connected to a router and the external network via the network I/F 10443.

Instead of the configuration as in FIG. 7A, for example, an on-chip router may be adopted which has input/output ports corresponding to the axes (X, Y) directions of the two-dimensional mesh stated above and a cross bar for switching connection between a buffer and the input/output ports. For example, a NIC as described above may be connected to one port .

Figure 7B:
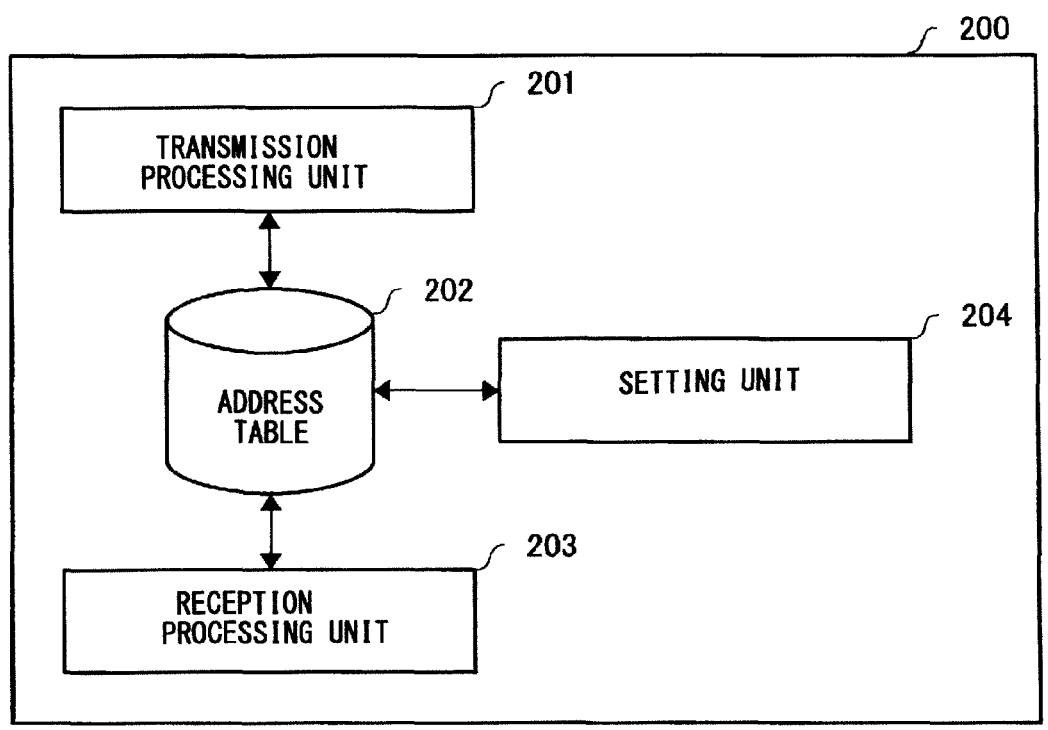
FIG. 7B is an example of a functional block diagram of a NIC.

FIG. 7B illustrates a functional block diagram of the Ethernet NIC that the router 104 has . The NIC 200 (corresponding to the Ethernet NICs 1G0N to 6G3N in FIGS. 3 and 5) according to the present embodiment has a transmission processing unit 201, an address table 202, a reception processing unit 203 and a setting unit 204. The transmission processing unit 201 receives an internal network packet from a transmission source calculation node (also referred to as a transmission source node) of the parallel computer, generates an Ethernet frame and transmits the Ethernet frame to a destination apparatus in the external network. Further, the transmission processing unit 201 extracts information indicating a detour route from the internal network packet and registers the information with the address table 202. A reception processing unit 203 receives an Ethernet frame from a transmission source apparatus in the external network, generates an internal network packet, and transmits the packet to a destination calculation node (also referred to as a transmission destination node or a destination node) of the parallel computer. Further, the reception processing unit 203 reads out the information indicating a detour route from the address table 202 and sets the information for the internal network packet. Further, for example, the setting unit 204 accepts an instruction from the management node via the internal network and registers information indicating a detour route with the address table or updates the information.

For example, by executing a program stored in the memory 10442, the CPU 10441 illustrated in FIG. 7A causes the Ethernet NIC as the transmission processing unit 201, the reception processing unit 203 and the setting unit 204.

[Routing]

The parallel computer according to the present embodiment adopts, for example, dimension-order routing as a method for packet routing among the internal calculation nodes. The dimension-order routing is a method of transferring packets in order of dimension. For example, in the case of the two-dimensional mesh illustrated in FIG. 2, a transmission source node, between arbitrary two calculation nodes, transfers a packet to a position in the X direction where a destination node is present (for example, a calculation node having an identification mark in which the number in the X direction is the same as that of the destination node) in the X direction first and, after that, transmits the packet to the destination node in the Y direction. Advantages of the dimension-order routing are that the routing is simple, that packets reach in order of being transmitted because a route from a certain transmission source node to a destination node is uniquely determined.

In the case of adopting the topology illustrated in FIG. 3 in which nodes are connected in complete connection within a group, and groups are connected in series (for example, in a one-dimensional torus shape) , it is also possible to apply the dimension-order routing, regarding each of the connections in a group and connections among groups as one dimension. That is, first, a packet is transferred to a calculation node present at a position corresponding to a destination node (given the same number in FIG. 3) in the same group as a transmission source node, and, after that, the packet is transferred to the destination node via links among the groups.

[Switching]

The parallel computer according to the present embodiment can adopt, for example, a worm-hole method or a virtual cut-through method as a packet switching method among the internal calculation nodes. In the worm-hole method, one packet is divided into a plurality of flits and transmitted. A flit is set to a size that can be transmitted in one cycle, for example, according to the band of a link between calculation nodes. Further, each calculation node has a buffer with a size capable of storing one flit. Each time receiving a flit , each calculation node transfers the received flit to the next calculation node.

Therefore, in the worm-hole method in which transfer is performed in flits, communication delay is smaller than a store-and-forward method in which transfer is performed in packets. Further, since the capacity of the buffer is smaller in comparison with preparing a buffer that can store the whole packet, cost is reduced. However, if there is not a space in the buffer of a transfer destination node, waiting occurs in a state that one packet occupies the buffers of a plurality of calculation nodes, and there is a possibility that communication performance deteriorates.

The virtual cut-through method is a method in which each calculation node has a buffer with a size capable of storing the whole packet, and transfer is performed in flits. If there is not a space in the buffer of a transfer destination calculation node, the following flits are stored in the buffer of a calculation node where a top flit is present. Therefore, it does not happen that waiting occurs in the state that one packet occupies the buffers of a plurality of calculation nodes. The size of communication delay is almost the same as that of the worm-hole method.

In the worm-hole method and the virtual cut-through methods described above, each calculation node can perform communication if it has at least one buffer for each link.

However, by providing a plurality of buffers for one link, a plurality of virtual channels can be provided. By using another virtual channel when waiting occurs over a plurality of calculation nodes, deterioration of communication performance can be reduced.

However, the capacity of a buffer is restricted in consideration of balance with cost. Therefore, realistically, there is a possibility that, if packets concentrate on a certain calculation node, the calculation node becomes a bottle neck. Since the plurality of calculation nodes of the parallel computer originally perform processing with reference to mutual calculation results, there is also a possibility that communication performed among the calculation nodes is influenced by congestion on a communication route. If the plurality of calculation nodes of the parallel computer are used for communication with the external network, for example, as illustrated in FIGS. 3 to 5, a load can be distributed.

Next, description will be made on a process for the calculation nodes included in the parallel computer as described above to communicate with the external network.

[Data Transmission from Parallel Computer to External Apparatus]

First, description will be made on a process for transmitting data from a calculation node inside the parallel computer to an external apparatus via a NIC. It is assumed that the parallel computer according to the present embodiment adopts, for example, the topology illustrated in FIG. 5 and performs the dimension-order routing. Further, all the calculation nodes have a CPU and a router, and all the routers have an Ethernet NIC. A calculation node which is connected to an external Ethernet and for which Ethernet NIC setting is "enabled" is also referred to as an I/O node for convenience.

At the time of transmitting an Ethernet frame from a calculation node to the external network in the case where the parallel computer has a plurality of I/O nodes, for example, the management node 4 illustrated in FIG. 5 controls an I/O node to be used for communication. That is, when inputting a job into a calculation node, the management node 4 notifies the node address of an I/O node to be used for communication with the external network during processing of the job. It is assumed that the node address is, for example, an identifier having a number for each dimension of the topology and is unique in the parallel computer, and it is assigned to each node in advance. The calculation node that has received the input of the job (that is, a transmission source calculation node) sets the notified node address of the I/O node for the head of an interconnect packet.

The transmission source node generates the interconnect packet, for example, by adding information such as a packet header to an Ethernet frame. Then, the transmission source node transmits the generated interconnect packet to the I/O node (that is, a transmission destination node or a destination node) via the router.

Figure 8:
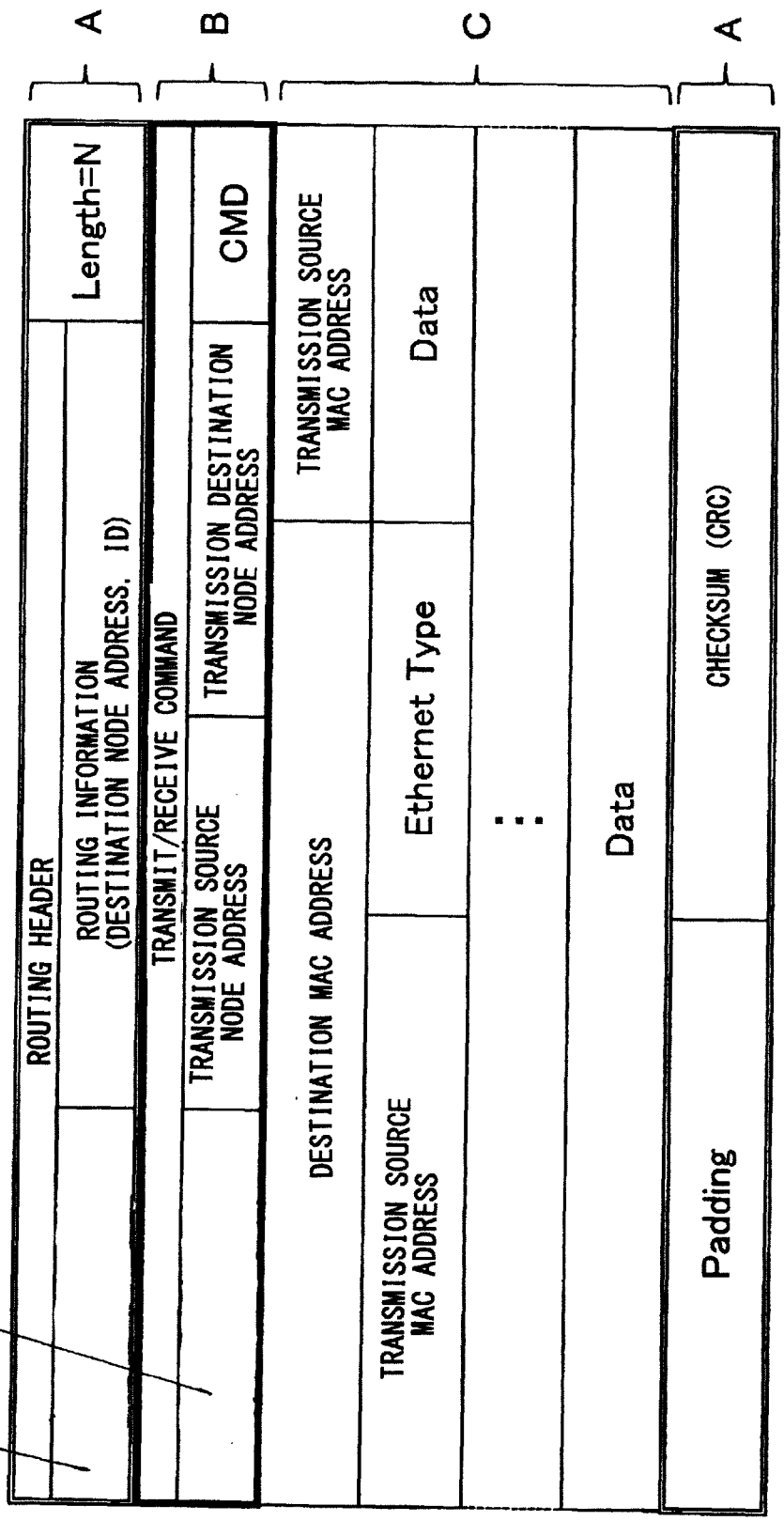
FIG. 8 is a diagram illustrating an example of the configuration of a packet according to an embodiment.

FIG. 8 illustrates an example of the configuration of an interconnect packet transmitted and received in the present embodiment. In FIG. 8, parts A surrounded by double lines indicate information to be used in an interconnect. Specifically, the parts A include a "routing header" having "detour route information (inside =>outside) " and "routing information", and "length =N" indicating a packet length, which are included at the top of a packet, and "padding" and a "checksum (CRC) " included at the end of the packet. The parts A are used in the internal network of the parallel computer. The routing information includes a "destination node address" and an "ID" instructing the router of a destination node which of the CPU of the calculation node and the Ethernet NIC the router has the router is to output the packet to.

In FIG. 8, a part B surrounded by a bold line (that is, a "transmit/receive command") is information indicating an instruction from the CPU of the calculation node to the Ethernet NIC. Specifically, the part B includes "detour route information (outside=>inside)", a "transmission source node address", a "transmission destination node address" and a "command (CMD)". The "command (CMD)" can be used to specify calculation of a checksum or division of the packet.

A remaining part C embedded between the above information is data included in a general Ethernet frame. Specifically, the part C includes a "destination MAC (Media Access Control) address", a "transmission source MAC address", an "Ethernet type" and transmission target "data", for example.

In addition to the information illustrated in FIG. 8, information not illustrated, such as a preamble, may be included in the interconnect packet. The information not illustrated, such as a preamble, may be added by the Ethernet NIC in the subsequent process. The transmission source node may further divide the interconnect packet into flits and transmit the flits.

The "transmission source node address" and the "transmission destination (destination) node address" (hereinafter, these will be also referred to simply as a "node address") are, for example, identifiers that have a number for each dimension of the topology and are unique in the parallel computer. If consecutive numbers are given to the calculation nodes in order of being connected, the node addresses can be used as coordinates indicating positions of the calculation nodes. Therefore, the plurality of routers of the parallel computer can also perform the dimension-order routing up to the transmission destination node address in accordance with predetermined rules without using a routing table and the like.

The detour route information can be indicated, for example, by the node address of a calculation node to pass through in the process of routing (hereinafter also referred to as a passed-through node). If a detour route includes a plurality of passed-through nodes, the detour route information may be a string of node addresses of the passed-through nodes. In the case of performing routing using a detour route, for example, a packet is transferred from a transmission source node to a passed-through node by the dimension-order routing first, and, next, the packet is transferred from the passed-through node to a transmission destination node by the dimension-order routing. The detour route can be determined with the use of an existing technique. For example, using an MPI (Message Passing Interface) library, the CPU transmits a test packet to another calculation node in accordance with a predetermined degree of priority and confirms communicability to determine the detour route.

A packet transmitted from a transmission source node is transferred to a destination node by the dimension-order routing on the basis of a "destination node address" included in routing information of the routing header. After that, the transmission destination I/O node converts the received interconnect packet to an Ethernet frame, and transmits the Ethernet frame to the external network. At this time, the Ethernet NIC of the I/O node reads out the "transmit/receive command" and the like included in the interconnect packet and registers information about a detour route from the I/O node to the transmission source node of the packet and the like with the address table.

Next, description will be made on a process for the Ethernet NIC to transmit an Ethernet frame with the use of FIGS. 9 and 10. First, when the router of an I/O node for which the Ethernet NIC function is enabled receives an interconnect packet, the router reads out an "ID" included in routing information of the routing header, and judges which of the CPU of the I/O node or the Ethernet NIC the router has the packet is to be outputted to. If an ID instructing the router to output the packet to the Ethernet NIC is set, the router sends the packet to the Ethernet NIC. Then, the Ethernet NIC performs a detour-route-and-the-like registration process (FIG. 9: S1). The detour-route-and-the-like registration process will be described with the use of FIG. 10.

Figure 10:
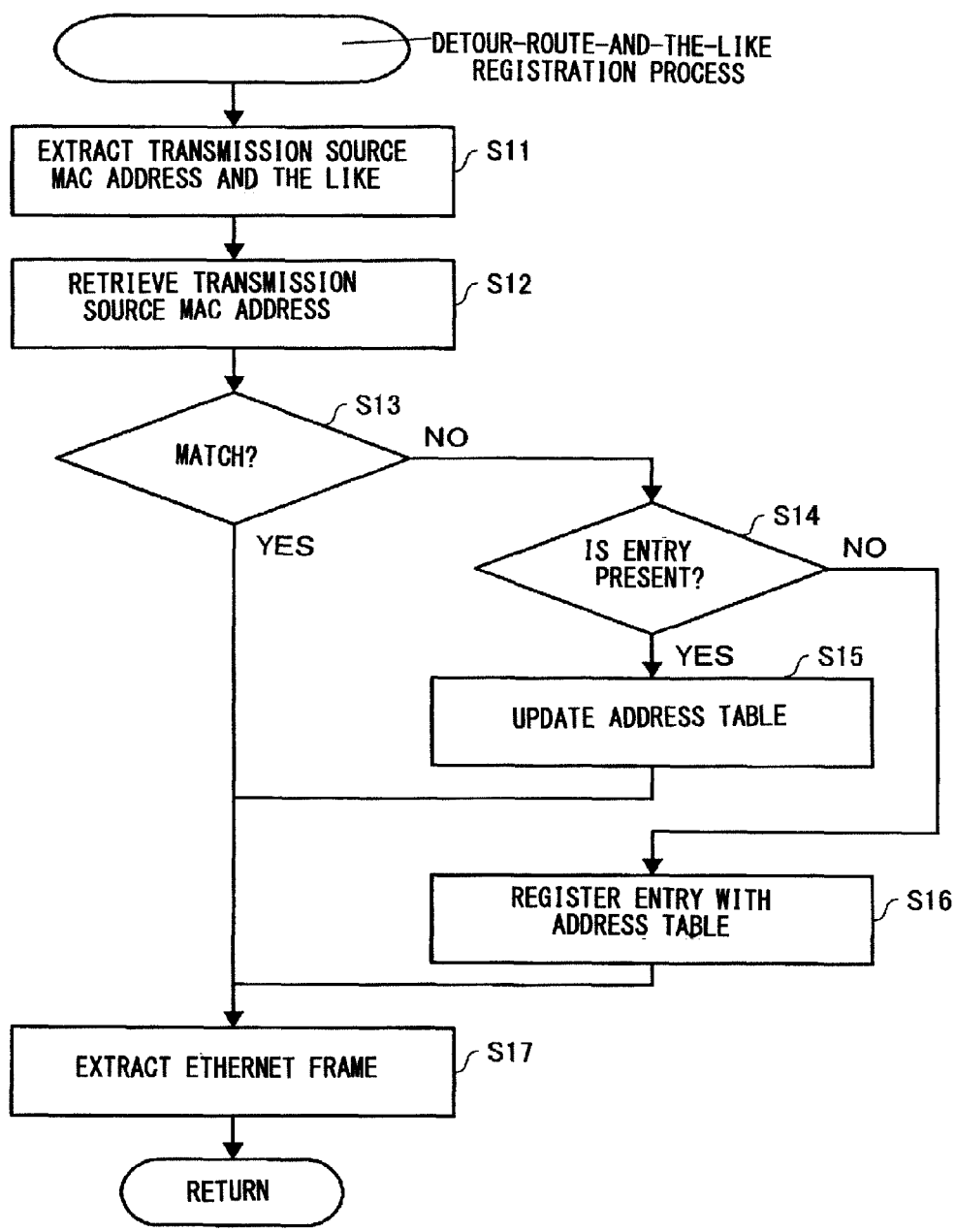
FIG. 10 is an example of a process flow of a process for the NIC registering a detour route.

When receiving the interconnect packet, the transmission processing unit 201 of the Ethernet NIC extracts a "transmission source node address", a "transmission source MAC address" and "detour route information" from the received packet (FIG. 10: S11). Further, the transmission processing unit 201 retrieves the extracted MAC address from the address table 202 (S12). Data as illustrated in FIG. 11 is registered with the address table 202.

Figures 11, 12:
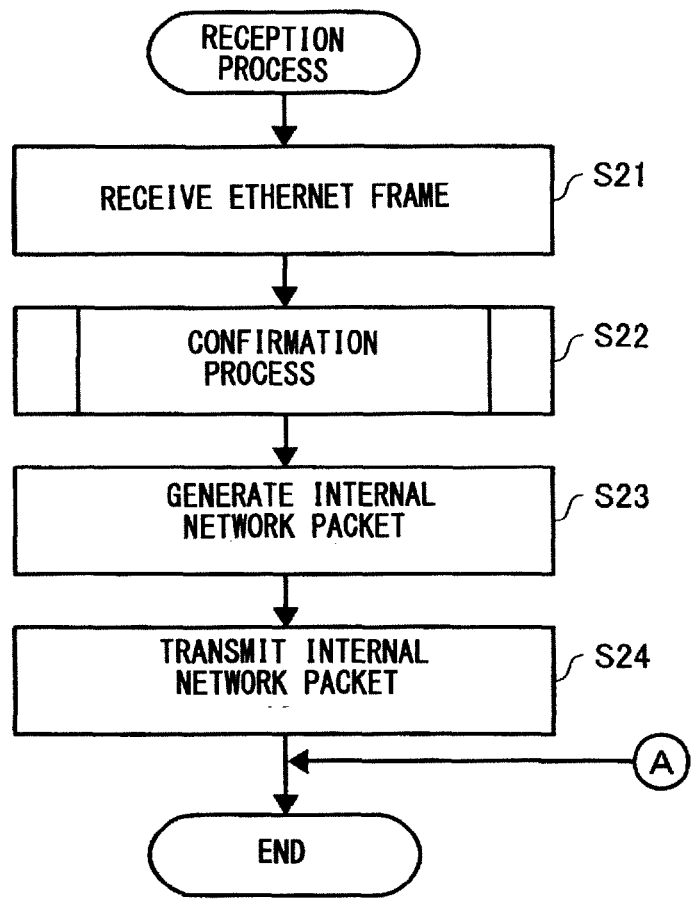
FIG. 11 is a diagram illustrating an example of information to be registered with an address table.
FIG. 12 is an example of a process flow of a process for receiving data from the external network.

The address table 202 illustrated in FIG. 11 has "MAC address", "node address" and "detour route" columns (also referred to as items). In the "MAC address" and "node address" columns, a "MAC address" and a "node address" given to a certain calculation node are associated and held. In the "detour route" column, detour route information indicating a detour route corresponding to a communication route from the I/O node to a certain calculation node is held.

For example, the transmission processing unit 201 of the Ethernet NIC registers an entry (that is, a record indicating one piece of data) with the address table 202 on the basis of information included in the interconnect packet. As described later, when detecting that any calculation node has failed, the management node may register an entry for such a calculation node that the failed calculation node is present on a communication route from the I/O node to the calculation node as a target, or, otherwise, a default detour route may be registered for all the calculation nodes in advance. In the present embodiment, an entry does not necessarily exist in advance for all the calculation node in the parallel computer.

Then, the transmission processing unit 201 judges whether the values of the "transmission source MAC address", "transmission source node address" and "detour route information (outside=>inside) " extracted from the received packet match the values of the "MAC address ", "node address" and "detour route" retrieved from the address table 202, respectively (S13). Here, in the case of not having been able to retrieve an entry also, it is judged that the values do not match.

Then, if it is judged that the content of the packet does not match the content of the address table 202 (S13: NO), the transmission processing unit 201 judges whether an entry is present or not (S14). That is, the transmission processing unit 201 judges whether the "transmission source MAC address"extracted from the received packet is registered with the address table 202. If it is judged that the entry is present in the address table 202 (S14: YES), the transmission processing unit 201 updates the entry in the address table 202 on the basis of the content of the received packet (S15) . That is, the transmission processing unit 201 updates the values of the "node address" and "detour route" items of the entry retrieved at S12 to the information of the "transmission source node address" and "detour route" information (outside =>inside) extracted from the packet.

On the other hand, if it is judged that the entry does not exist in the address table 202, the transmission processing unit 201 adds the entry to the address table 202 (S16) . That is, the transmission processing unit 201 registers the "transmission source MAC address", "transmission source node address" and "detour route" information (outside =>inside) extracted from the packet with the "MAC address", "node address" and "detour route" items of the address table 202, respectively.

If it is judged at S13 that the content of the packet and the content of the address table match each other (S13: YES), or after S15 or S16, the transmission processing unit 201 extracts the Ethernet frame from the packet (S17). Here, the transmission processing unit 201 extracts, from the packet as illustrated in FIG. 8, data excluding the parts A surrounded by the double lines and the part B surrounded by the bold line (that is, the part C in FIG. 8).

Figure 9:
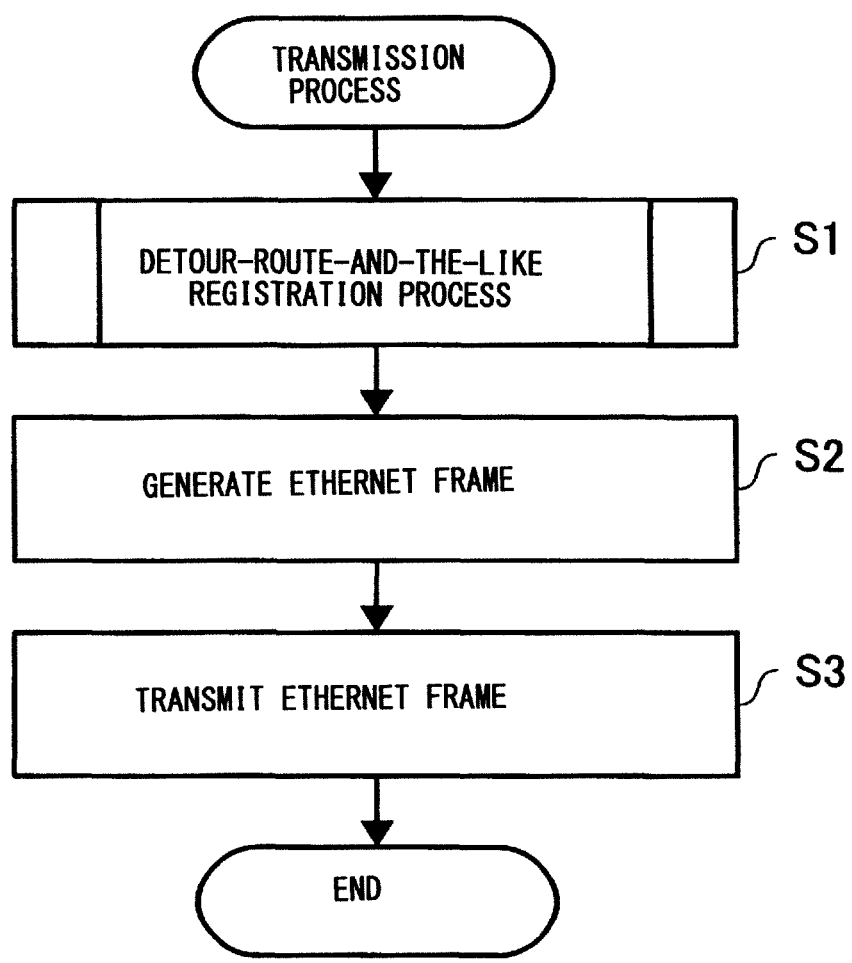
FIG. 9 is an example of a process flow of a process for transmitting data to an external network.

After that, returning to the process in FIG. 9, the transmission processing unit 201 of the Ethernet NIC generates an Ethernet frame (FIG. 9: S2). Specifically, the transmission processing unit 201 adds a preamble, an FCS (Frame Check Sequence) and the like to generate an Ethernet frame. The FCS is set, for example, by calculating a CRC (Cyclic Redundancy Check) value from the value of each field. Thus, a format in conformity with an existing standard can be used as the format of the Ethernet frame. After that, the transmission processing unit 201 transmits the generated Ethernet frame to the external network (S3).

In other words, when the transmission source node and the I/O node are assumed to be a first node and a second node, respectively, the above configuration can be as follows. The first node of the parallel computer has a processing unit (for example, the CPU and the network I/F of the first node) that sets detour route information corresponding to a communication route from the second node to the first node for data (for example an interconnect packet) to be transmitted to the second node that includes a network interface (for example, an Ethernet NIC) and transmits the data. Further, the network interface of the second node has a setting unit (for example, the reception processing unit 203) that, when receiving data from the first node, reads out the detour route information corresponding to the communication route from the second node to the first node from the data and holds the data in a storage unit.

By performing the process as described above, the transmission processing unit 201 of the Ethernet NIC according to the present embodiment, can convert an interconnect packet to an Ethernet frame and transmit the Ethernet frame to the external network. In other words, the calculation node of the parallel computer according to the present embodiment can embed an Ethernet frame into an interconnect packet and transmit the packet directly to an external apparatus via a router and an Ethernet NIC not via a process by the CPU of another calculation node.

Further, the transmission processing unit 201 of the Ethernet NIC can cause a MAC address, a node address and a detour route to be stored into the address table 202.

By using an entry stored in the address table 202, the Ethernet NIC can, when receiving data (for example, an Ethernet frame) from the external network, perform conversion to an address in the internal network (for example, a node address) on the basis of a physical destination address (for example, a destination MAC address) included in the data as well as setting a detour route corresponding to a communication route to a destination node.

[Reception of Data from External Apparatus]

Next, a process for receiving data from an external apparatus will be described with the use of FIGS. 12 and 13. First, the reception processing unit 203 of the Ethernet NIC that a router of the parallel computer has receives an Ethernet frame from the external network (FIG. 12: S21). In the present embodiment, there may be a case where there are a plurality of Ethernet NICs connected to the external network. In this case, each Ethernet NIC may be adapted to work as a virtual NIC that receives all Ethernet frames destined to a "MAC address" held in its the address table 202.

Then, the reception processing unit 203 performs an Ethernet frame confirmation process (S22). This confirmation process will be described with the use of FIG. 13. The reception processing unit 203 generates a checksum first (FIG. 13: S31). Specifically, a CRC value is calculated on the basis of the value of each field included in the received Ethernet frame. Then, the reception processing unit 203 judges whether the value of the generated checksum and the value of a checksum set for the received Ethernet frame (also referred to as an FCS value or a CRC value) match each other (S32).

If it is judged that the values do not match (S32: NO), the reception processing unit 203 discards the received Ethernet frame (S33) and ends the reception process. That is, the process returns to the process in FIG. 12 via a connector A in FIG. 13 and ends the reception process. On the other hand, if it is judged that the values match (S32: YES), the reception processing unit 203 extracts a "destination MAC address" from the received Ethernet frame, and retrieves the extracted "MAC address" from the address table 202 (S34). Then, the reception processing unit 203 judges whether an entry that includes the extracted "destination MAC address" is present in the address table 202 (S35).

If it is judged that the entry is present (S35: YES), the reception processing unit 203 extracts a "node address" and "detour route information" registered in association with the "destination MAC address" in the address table (S36). On the other hand, if it is judged at S35 that the entry does not exist (S35: NO), the reception processing unit 203 determines all the calculation node as destinations (S37). That is, the reception processing unit 203 broadcasts the interconnect packet to all the calculation nodes in the subsequent process. Then, after S36 or S37, the process returns to the process in FIG. 12.

After that, the reception processing unit 203 generates an internal network packet (FIG. 12: S31). If acquiring the node address and the detour route information at S36 in FIG. 13, the reception processing unit 203 sets the node address and detour route information extracted from the address table in a routing header to generate a packet that includes the received Ethernet frame.

An interconnect packet destined to a calculation node in the parallel computer can adopt the configuration illustrated in FIG. 8. However, "detour route information (outside=>inside)" is set instead of the "detour route information (inside=>outside)" in FIG. 8. A configuration obtained by deleting the "transmit/receive command" from the packet illustrated in FIG. 8 may be adopted.

Figure 13:
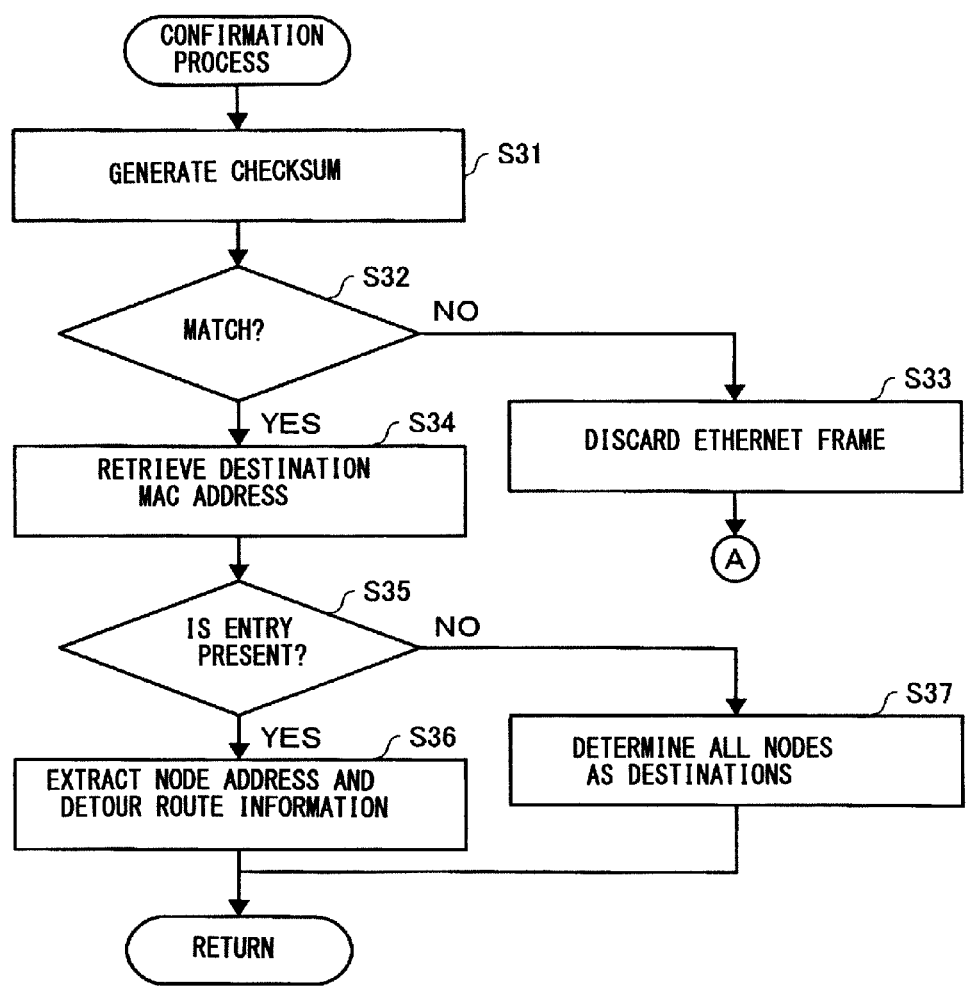
FIG. 13 is an example of a process flow of a process for confirming a destination of data.

On the other hand, if all the calculation nodes are determined as destinations at S37 in FIG. 13, for example, information indicating that all the calculation nodes are to be destinations is set in the "routing information" of the "routing header" to generate a packet that includes the received Ethernet frame. In this case, the reception processing unit 203 does not set "detour route information" for the packet. Then, the reception processing unit 203 transmits the generated packet to the internal network of the parallel computer (S24). Specifically, the router that includes the Ethernet NIC transfers the packet to the router of any connected calculation node according to the "routing information" of the routing header. The transmitted packet is transferred to the destination calculation node, for example, by the dimension-order routing.

When "detour route information" is set in the routing header in the case where transfer through a normal route is impossible, such as in the case where a calculation node present on the communication route has failed, for example, the transfer route can be changed on the basis of the set "detour route information". For example, when it is detected that a calculation node on the communication route has failed, a calculation node that detects the failure may add information for causing a detour route to be selected, into the "routing information" of a packet so that the packet is transferred on the basis of the information. Further, the router of each calculation node may be adapted to hold information about presence/absence of a failure in the other calculation node in order to make it possible to judge which of a normal communication route or a detour route a packet is to be transferred on the basis of.

On the other hand, in the case where an interconnect packet is transmitted with all the calculation node as destinations, the packet is transferred to all the nodes. Then, a calculation node that has the same MAC address as the destination MAC address holds the received packet, and the other calculation nodes discard the received packets.

As described above, in the present embodiment, the Ethernet NIC of an I/O node embeds an Ethernet frame of the external network into an interconnect packet and transfers the packet to a calculation node of the internal network. Therefore, it is possible to directly transmit the Ethernet frame from the external network to the calculation node of the internal network not via a process by the CPU of a passed-through calculation node but via the Ethernet NIC and the router.

Further, the Ethernet NIC of an I/O node can set detour route information in an interconnect packet. Therefore, even when a trouble such as a failure occurs in a calculation node on a transfer route, and use of a normal transfer route is impossible, it is possible to transfer data received from an external apparatus to a calculation node in the parallel computer using a detour route.

Further, in the present embodiment, an Ethernet NIC that the router of an I/O node has is provided with the address table 202, and the Ethernet NIC generates an interconnect packet without a CPU performing processing. Therefore, it is possible to reduce a load on the CPU of the I/O node.

[Detour Route Setting Process by Management Node]

Figure 14:
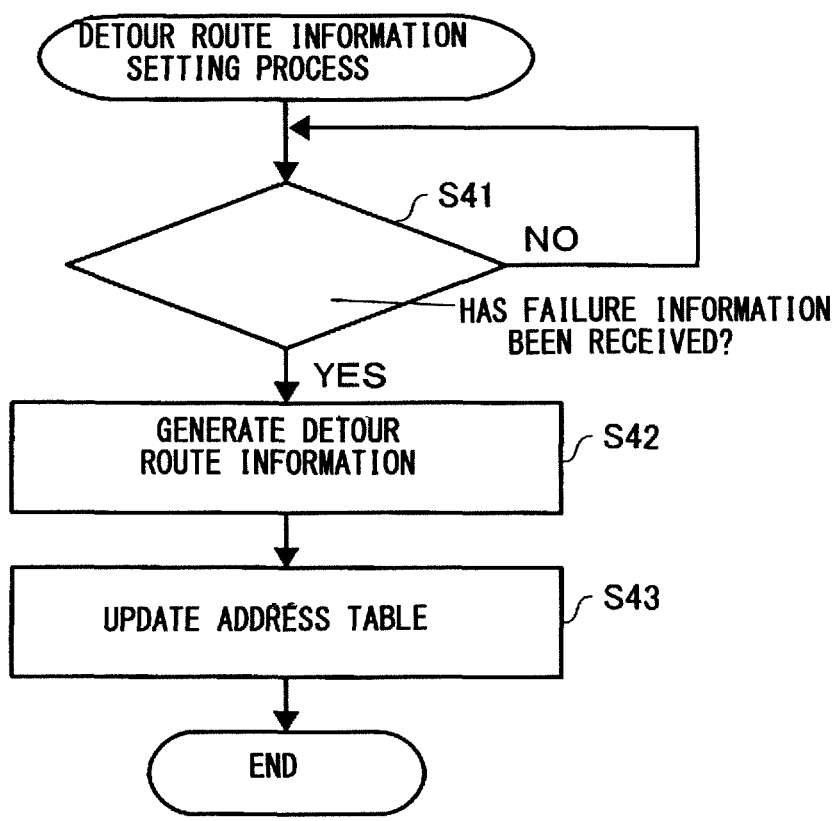
FIG. 14 is an example of a process flow of a process for a management node to set detour route information.

If a trouble has occurred in a calculation node of the parallel computer, the management node can cause detour route information for making a detour to avoid the calculation node where the trouble has occurred, to be registered with an Ethernet NIC. FIG. 14 illustrates a process flow for the management node to register the detour route information.

First, the management node (for example, the management node 4 in FIG. 5) judges whether the management node has received failure information indicating that any calculation node has failed (FIG. 14: S41). If the management node has not received the failure information (S41: NO), the management node repeats the process of S41 until it receives the failure information. As for transmission of the failure information, there are cases such as a case where a calculation node that has failed detects the failure itself and notifies the management node of failure information and a case where another calculation node connected to a calculation node that has failed detects the failure and notifies the management node of failure information, depending on causes of failure.

If receiving the failure information (S41: YES), the management node generates detour route information (S42). Here, the management node determines a detour route for such a calculation node that a normal transfer route from an I/O node by the dimension-order routing passes through the calculation node that has failed.

For example, in the case of such a parallel computer that the topology is a two-dimensional mesh, and routing is performed in order of the X direction=>the Y direction, the following calculation nodes are targeted: (1) a calculation node the X-direction position of which is the same as that of the I/O node and which is positioned farther than the calculation node that has failed when seen from the I/O node, and (2) a calculation node the Y-direction position of which is the same as that of the calculation node that has failed and which is positioned farther than the calculation node that has failed when seen from the I/O node. Similarly, for a parallel computer adopting the topology illustrated in FIGS. 3 and 5 also, it is possible to identify such a calculation node that its normal transfer route passes through a calculation node that has failed. Then, the management node generates information about a detour route from the I/O node to each of the targeted calculation nodes.

Then, the management node updates the address table 202 held by the Ethernet NIC of the I/O node using the generated detour route information (S43). That is, the management node notifies the I/O node of an instruction for causing the address table to be updated, and the setting unit 204 of the Ethernet NIC that the I/O node having received the instruction has updates the address table 202. More specifically, the setting unit 204 registers the detour route information generated by the management node in association with the node identifier and MAC address of each of the calculation nodes targeted at S42.

As for such a packet that transfer was impossible due to a failure of a calculation node on a communication route or the like, the packet can be retransmitted, for example, by a retransmission process of the TCP protocol or by a retransmission process of a higher-order software layer.

As described above, the management node can detect a trouble in a calculation node by receiving a predetermined notification. The management node can set detour route information for making a detour to avoid the calculation node where the trouble has occurred, for the Ethernet NIC (that is, the network interface) of an I/O node. By doing so, the Ethernet NIC of the I/O node becomes able to set the detour route information for making a detour to avoid the calculation node where the trouble has occurred, in an interconnect packet.

[Network Interface Enabling Process]

Independently from the process described above, the management node may perform control to enable and disable an Ethernet NIC. For example, the management node holds "enabled" or "disabled" setting in association with the Ethernet NIC of each calculation node in a predetermined register the management node has. The management node changes the setting at the time of starting the parallel computer or when the management node inputs a job into a calculation node. Especially, by controlling the number or positions of calculation nodes used for communication with the external network according to the state of allocation of jobs to the calculation nodes or a communication load in the internal network, the load of the internal network can be distributed.

The internet topology is not limited to the examples in FIGS. 3 to 5. Mesh, torus or other topologies may be adopted. Further, though description has been made with the use of an Ethernet as an example of an external network in the present embodiment, other communication protocols may be applied.

[Effect of Embodiment]

According to the disclosed technique, it is possible to, even if a trouble occurs in a calculation node on a communication route in the case of transmitting data received from an external network to a calculation node in the parallel computer, transfer the data making a detour to avoid the calculation node where the trouble has occurred.

[Computer Readable Recording Medium]

A program that causes a computer, or the other machine or device (hereafter, referred to as a computer or the like) to implement any one of the above-described functions can be recorded in a non-transitory recording medium readable by the computer or the like. Then, the function can be provided by causing the computer or the like to read and execute the program in this recording medium. Herein, the recording medium readable by the computer or the like means a recording medium capable of accumulating information such as data or programs through electrical, magnetic, optical, mechanical, or chemical actions, which can be read by the computer or the like. Among such recording media, those detachable from the computer or the like include, for example, a flexible disk, magneto-optical disk, CD-ROM, CD-R/W, DVD, Blu-ray Disk, DAT, 8 mm tape, and a memory card such as a flash memory. In addition, recording media fixed in the computer or the like include a hard disk and ROM (Read Only Memory).

What is claimed is:

1. A parallel computer, comprising:
   a plurality of nodes, each of the plurality of nodes respectively including:
   a router directly or indirectly connected to each of the other nodes; and a network interface connected to an external network of the parallel computer, wherein the network interface includes:

a storage unit that stores detour route information indicating a detour route corresponding to a communication route from a node in which the network interface is included to another node; and a reception processing unit that, when the network interface receives data destined by a destination address to a destination node of the parallel computer from the external network, adds detour route information to the received data destined by the destination address, the added detour route information corresponding to a communication route from the node in which the network interface is included to the destination node of the data, and transmits the data destined by the destination address with the detour route information added, to the destination node.

2. The parallel computer according to claim 1, wherein a first node of the parallel computer includes a processing unit that adds, to data to be transmitted to a second node that includes the network interface, detour route information corresponding to a communication route from the second node to the first node and transmits the data, and the network interface of the second node includes a setting unit that, when receiving data from the first node, reads out the detour route information corresponding to the communication route from the second node to the first node from the received data and sets the read detour route information in the storage unit.

3. The parallel computer according to claim 1, further comprising a management node that controls operations of the plurality of nodes, wherein the management node, when receiving information indicating that any of the nodes has failed, generates detour route information corresponding to a communication route passing through the node that has failed and causes the generated detour route information to be stored into the storage unit of the network interface.

4. The parallel computer according to claim 3, wherein a plurality of routers of any of the plurality of nodes include a network interface connected to the external network, and the management node determines the network interface to be used for communication with the external network.

5. The parallel computer according to claim 1, wherein the storage unit of the network interface stores a node identifier identifying each of the plurality of nodes in an internal network of the parallel computer, a physical address corresponding to each of the plurality of nodes, and detour route information in association with one another, and the network interface, when receiving data destined to a physical address stored in the storage unit from the external network, generates a packet that includes the node identifier and the detour route information that are stored in the storage unit in association with the physical address and the received data and transmits the packet to the internal network.

6. A node apparatus being included in a parallel computer, the node apparatus comprising:

a network interface being connected to an external network, wherein the network interface includes:

a storage unit that stores detour route information indicating a detour route corresponding to a communication route from the node apparatus to another node apparatus; and a reception processing unit that, when the network interface receives data destined by a destination address to a destination node apparatus from the external network, adds detour route information to the received data destined by the destination address, the added detour route information corresponding to a communication route from the node apparatus to the destination node apparatus and transmits the data destined by the destination address with the detour route information added, to the destination node apparatus.

7. A control method for a parallel computer that includes a plurality of nodes, each of the plurality of nodes respectively including a router directly or indirectly connected to each of the other nodes, and at least one of the routers including a network interface connected to an external network, the control method comprising:

storing, by the network interface, detour route information indicating a detour route corresponding to a communication route from a node in which the network interface is included to another node; and adding, by the network interface, when receiving data destined by a destination address to a destination node of the parallel computer from the external network, detour route information to the received data destined by the destination address, the added detour route information corresponding to a communication route from the node in which the network interface is included to the destination node of the data for the data and transmitting the data destined by the destination address with the detour route information added, to the destination node.

* * * * *